United States Patent
Tonar

(10) Patent No.: US 10,303,031 B2
(45) Date of Patent: May 28, 2019

(54) ELECTRO-OPTIC GAS BARRIER

(71) Applicant: Gentex Corporation, Zeeland, MI (US)

(72) Inventor: William L. Tonar, Holland, MI (US)

(73) Assignee: GENTEX CORPORATION, Zeeland, MI (US)

( * ) Notice: Subject to any disclaimer, the term of this patent is extended or adjusted under 35 U.S.C. 154(b) by 90 days.

(21) Appl. No.: 15/352,945

(22) Filed: Nov. 16, 2016

(65) Prior Publication Data

US 2017/0139302 A1    May 18, 2017

Related U.S. Application Data

(60) Provisional application No. 62/257,136, filed on Nov. 18, 2015.

(51) Int. Cl.
  *G02F 1/15*    (2019.01)
  *G02F 1/153*    (2006.01)
  *B60R 1/08*    (2006.01)

(52) U.S. Cl.
  CPC ............ *G02F 1/1533* (2013.01); *B60R 1/088* (2013.01); *G02F 2001/1536* (2013.01)

(58) Field of Classification Search
  CPC ........... G02F 1/1533; G02F 2001/1536; G02F 1/061; G02F 1/07; G02F 1/13; G02F 1/15–1/167; B60R 1/088
  USPC .................................................. 359/245–279
  See application file for complete search history.

(56) References Cited

U.S. PATENT DOCUMENTS

| | | |
|---|---|---|
| 5,760,860 A | 6/1998 | Mason et al. |
| 6,193,379 B1 | 2/2001 | Tonar |
| 2003/0002006 A1* | 1/2003 | Freeman .............. G02F 1/13392 349/156 |

(Continued)

FOREIGN PATENT DOCUMENTS

| | | |
|---|---|---|
| JP | 0011271736 A | 10/1999 |
| JP | 2001305993 A | 11/2001 |

(Continued)

OTHER PUBLICATIONS

International Search Report and Written Opinion of the International Searching Authority, dated Feb. 27, 2017, for International Application No. PCT/US 2016/062212; 10 pages.

*Primary Examiner* — Wen Huang
(74) *Attorney, Agent, or Firm* — Price Heneveld LLP; Bradley D. Johnson

(57) ABSTRACT

An electro-optic element is provided that includes a first substantially transparent substrate having first and second surfaces disposed on opposite sides thereof. The second surface has a first electrically conductive layer and a second substantially transparent substrate has third and fourth surfaces disposed on opposite sides thereof. The third surface includes a second electrically conductive layer. At least one of the first and second substantially transparent substrates includes a polymer. A primary seal is positioned such that the primary seal and the first and second substrates define a cavity therebetween. An electro-optic medium is disposed in the cavity. The electro-optic medium is variably transmissive such that the electro-optic medium is operable between generally clear and darkened states. A polymeric barrier is disposed between the first electrically conductive layer and the electro-optic medium.

19 Claims, 2 Drawing Sheets

(56) References Cited

U.S. PATENT DOCUMENTS

| | | | |
|---|---|---|---|
| 2007/0002420 A1 | 1/2007 | Rukavina | |
| 2007/0138941 A1* | 6/2007 | Jin | H01L 27/3232 |
| | | | 313/503 |
| 2007/0278448 A1 | 12/2007 | Krishnan | |
| 2009/0215279 A1* | 8/2009 | Kim | H01L 51/448 |
| | | | 438/763 |
| 2010/0196683 A1* | 8/2010 | Haskal | G02F 1/133305 |
| | | | 428/212 |
| 2011/0267673 A1* | 11/2011 | Agrawal | G02F 1/155 |
| | | | 359/267 |
| 2012/0038967 A1* | 2/2012 | Copeland | C09K 9/02 |
| | | | 359/269 |
| 2015/0085341 A1 | 3/2015 | Ash et al. | |

FOREIGN PATENT DOCUMENTS

| | | |
|---|---|---|
| JP | 2008225402 A | 9/2008 |
| JP | 2008233317 A | 10/2008 |
| JP | 2009093058 A | 4/2009 |

\* cited by examiner

ELECTRO-OPTIC GAS BARRIER

CROSS-REFERENCE TO RELATED APPLICATIONS

This application claims the benefit of and priority to U.S. Provisional Patent Application No. 62/257,136, filed on Nov. 18, 2015, entitled ELECTRO-OPTIC GAS BARRIER, the entire disclosure of which is hereby incorporated herein by reference.

BACKGROUND OF THE DISCLOSURE

Vehicles typically include a rearview mirror system to allow a driver of the vehicle to observe behind the vehicle. Environmental conditions may present constraint issues related to gas and moisture on the components of the rearview mirror assembly.

SUMMARY OF THE DISCLOSURE

According to one aspect of the present disclosure, an electro-optic element is provided that includes a first substantially transparent substrate having first and second surfaces disposed on opposite sides thereof. The second surface has a first electrically conductive layer and a second substantially transparent substrate has third and fourth surfaces disposed on opposite sides thereof. The third surface includes a second electrically conductive layer. At least one of the first and second substantially transparent substrates includes a polymer. A primary seal is positioned such that the primary seal and the first and second substrates define a cavity therebetween. An electro-optic medium is disposed in the cavity. The electro-optic medium is variably transmissive such that the electro-optic medium is operable between generally clear and darkened states. A polymeric barrier is disposed between the first electrically conductive layer and the electro-optic medium.

According to another aspect of the present disclosure, an electro-optic element is provided that includes a first substantially transparent substrate having first and second surfaces disposed on opposite sides thereof. A second substantially transparent substrate has third and fourth surfaces disposed on opposite sides thereof. The first and second substantially transparent substrates include a moisture resistant polymer. A primary seal is disposed on a perimeter of the first and second substrates. An electro-optic medium is positioned between the first and second substantially transparent substrates. A barrier is positioned between at least one of the first substrate and the second substrate and the electro-optic medium. The barrier is positioned inboard of an outboard edge of the primary seal.

According to yet another aspect of the present disclosure, an electro-optic element is provided that includes a first substantially transparent substrate having first and second surfaces disposed on opposite sides thereof. The first substantially transparent substrate includes a moisture resistant polymer. A second substantially transparent substrate has third and fourth surfaces disposed on opposite sides thereof. The second substantially transparent substrate includes a moisture resistant polymer. An electro-optic medium is positioned between the first and second substantially transparent substrates. A polymeric barrier is positioned between the first substantially transparent substrate and the electro-optic medium. The polymeric barrier is configured to resist gas transmission.

These and other aspects, objects, and features of the present disclosure will be understood and appreciated by those skilled in the art upon studying the following specification, claims, and appended drawings.

DETAILED DESCRIPTION OF THE EMBODIMENTS

Figure 1:
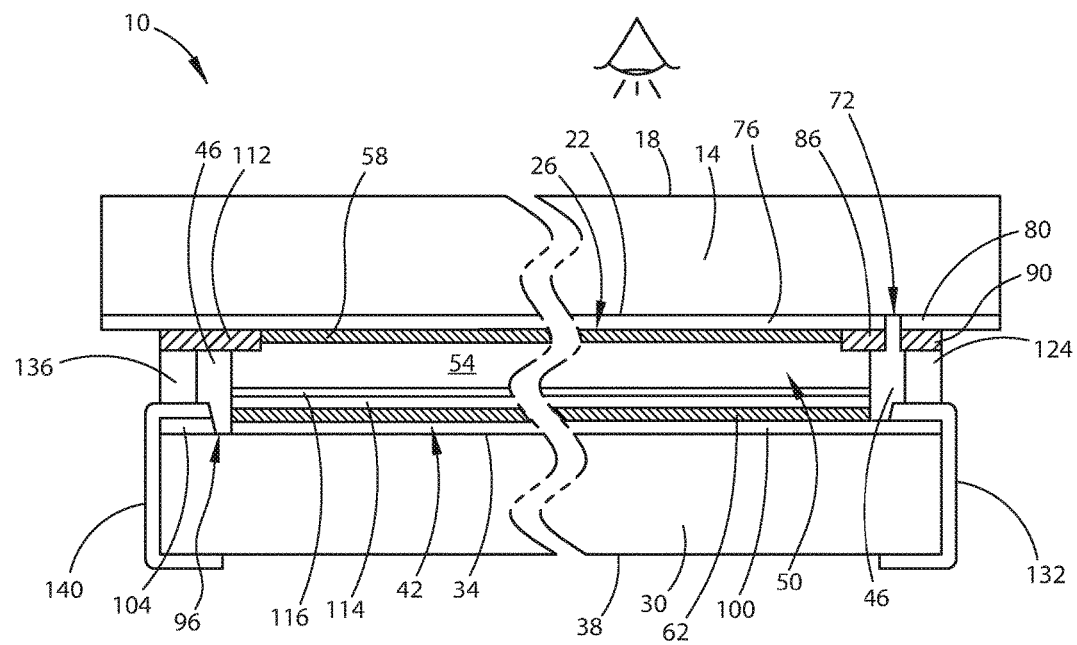
FIG. 1 is a cross-sectional view of an electro-optic element, according to one example.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise.

Referring to FIGS. 1-3B, reference numeral 10 generally designates an electro-optic element having a first substantially transparent substrate 14 having a first surface 18 and second surface 22 disposed on opposite sides thereof. The second surface 22 includes a first electrically conductive layer 26. A second substantially transparent substrate 30 defines a third surface 34 and a fourth surface 38 disposed on opposite sides thereof. The third surface 34 includes a second electrically conductive layer 42. At least one of the first and second substantially transparent substrates 14, 30 includes a polymer. A primary seal 46 is positioned such that the primary seal 46 and the first and second substrates 14, 30 define a cavity 50 therebetween. An electro-optic medium 54 is disposed in the cavity 50. The electro-optic medium 54 is variably transmissive such that the electro-optic medium 54 is operable between generally clear and darkened states. In one embodiment, a conductive polymeric barrier 58 is disposed between the first electrically conductive layer 26 and the electro-optic medium 54.

In at least one embodiment, a first isolation area 72 is disposed through the first electrically conductive layer 26 such that the first electrically conductive layer 26 is divided into a first conductive portion 76 and a second conductive portion 80. In various embodiments, the first and second electrically conductive layers 26, 42 may be formed of at least one of indium-tin-oxide, aluminum-doped zinc-oxide and indium-doped cadmium-oxide, carbon nanotubes, graphene, silver nanowires, a conductive polymer, a patterned metal mesh, patterned metal lines or combinations thereof. In some embodiments, the first and second electrically conductive layers 26, 42 may be applied to the first and second substrates 14, 30 after a thin adhesion enhancing layer such as chrome and/or a metal oxide, nitride or oxynitride such as $SiO_2$, SiN and/or SiON is applied. The isolation area 72 is electrically isolating, thus preventing the first and second conductive portions 76, 80 from being in electrical contact with each other. As such, the first isolation area 72 may be defined or so created with or without removing portions of electrode materials on the second surface 22. It should also be understood that the isolation area 72 and the second conductive portion 80 are not necessary in all aspects of this disclosure.

Referring again to the depicted embodiment of FIG. 1, a portion of the first isolation area 72 is shown to be extending parallel within a portion of the primary seal 46 located near the center thereof. It should be understood that the primary seal 46, as used herein within this disclosure, may also include a plug that is introduced after the electro-optic medium 54 has been introduced within the electro-optic element 10. In various embodiments, the primary seal 46 may be applied to the first or second substrates 14, 30 by methods commonly used in the liquid crystal display (LCD) industry, such as by silk-screening or dispensing. This portion of the isolation area 72 may lie such that a viewer would not readily perceive a line between a first spectral filter portion 86 and a second spectral filter portion 90. The first and second spectral filter portions 86, 90 may incorporate a hiding layer such as a chrome ring, or other similar finish, to conceal the primary seal 46. Accordingly, the first and second spectral filter portions 86, 90 can be fabricated or otherwise contain opaque or mirror-like constituents (e.g., chrome-containing coatings, lustrous metals or other mirror-like coatings) with low optical transmissivity. For example, a portion of the isolation area 72 may be substantially aligned with an inboard edge of the second spectral filter portion 90. It should be understood that when any portion of the isolation area 72 is located inboard of the primary seal 46, a discontinuity in the coloring of the electro-optic medium 54 and/or clearing may be observed. This operational characteristic may be manipulated to derive a subjectively visually appealing element 10. The isolation area 72 may also be of a dimension smaller than the eye can readily see, e.g., less than 10 μm wide. The primary seal 46 may also be applied to a perimeter of the first and second substrates 14, 30, as explained in greater detail below.

In various embodiments, the first substrate 14 may be dimensionally mismatched (e.g., wider, longer or of a different shape) with the second substrate 30 to create an offset along at least a portion of the perimeter of the electro-optic element 10. Similarly, the second substrate 30 can be the same size as, or larger than, the first substrate 14. In some aspects, the first substrate 14 can be shaped, (e.g., with an edge having a continuously arcuate shape), to hide or mask the second substrate 30, as detailed in U.S. Patent Application Publication No. 2014/0055836, which is hereby incorporated herein in its entirety by reference within this application. The perimeter of the first or second substrates 14, 30 of the electro-optic element 10 may have a molded edge, a cut edge, a ground edge, a beveled edge, a seamed edge, a laser cut edge, or combinations thereof. The first and/or second substrates 14, 30 may include glass, plastic, glass-ceramic, ceramics, and combinations thereof. In some embodiments, the first and second substrates 14, 30 may have different compositions than one another. Plastic embodiments of the first and second substrates 14, 30 may be advantageous in providing a weight reduction to the electro-optic element 10 or providing a chemical resistance to the electro-optic element 10. Plastic embodiments of the substrates 14, 30 may be formed via casting, injection molding, extrusion, or combinations thereof. Plastic embodiments of the substrates 14, 30 may be in a rigid form, semi-flexible form, flexible form, or be a film form. In plastic embodiments, the first and/or second substrates 14, 30 may include a moisture resistant polymer including at least one of cyclo olefin, polyethylene terephthalate, polyethylene naphthalate, polyimide, high density polyethylene, polysulfone, acrylic, polycarbonate, acrylonitrile butadiene styrene, polychlorotrifluoroethylene, polyphenylene sulfide, poly(methyl methacrylate), other moisture resistant polymers and combinations thereof. Additionally, the first and second substrates 14, 30 may be resistant to the penetration or transmission of gases (e.g., atmospheric gases, hydrogen, oxygen, nitrogen, carbon dioxide, noble gases and/or combinations thereof). Further, in various embodiments, the polymer selected for the first and second substrates 14, 30 may have a high melting temperature and/or glass transition temperature such that the first and second substrates 14, 30 may withstand hot vacuum coating operations (e.g., to apply the first and second electrically conductive layers 26, 42). Some polymers exhibiting low oxygen or gas permeation may be moisture sensitive. Accordingly, in embodiments of the electro-optic element 10 utilizing moisture sensitive polymers (e.g., polymeric barrier 58), it may be desired to place the entirety of the polymer inboard of the primary seal 46 or position the polymer such that a portion of the seal 46 covers the perimeter edges of the polymer.

Disposed within the second electrically conductive layer 42 is a second isolation area 96. The second isolation area 96 splits the second electrically conductive layer 42 into a third conductive portion 100 and a fourth conductive portion 104 which are shown proximate to the third surface 34 and substantially electrically insulated via the second isolation area 96. A portion of the second isolation area 96 is shown to be extending parallel within a portion of the primary seal 46 located near the center thereof. Further, this portion of the second isolation area 96 may lie such that a viewer would not readily perceive a line within the spectral filter material. For example, a portion of the second isolation area 96 may be substantially aligned with an inboard edge of a third spectral filter portion 112. In some implementations, the second isolation area 96 may extend to the outbound edge of the second substrate 30 in such a way as to eliminate the fourth conductive portion 104. In other implementations, the second isolation area 96 and the fourth conductive portion 104 may not be present. An optional optical layer 114 may be applied between an overcoat 116 (also optional) and the third conductive portion 100. The optical layer 114 may be reflective (e.g., through use of a metal reflector), transmissive, or may have a combination of partially reflective and partially transmissive properties. In some embodiments, the optical layer 114 may be configured as any of the partially reflective, partially transmissive ("transflective") coatings disclosed in U.S. Pat. No. 6,700,692, the entire disclosure of which is incorporated herein by reference.

With further reference to the exemplary electro-optic element 10 depicted in FIG. 1, the first isolation area 72 cooperates with a portion of the primary seal 46 to define the second conductive portion 80 and the second spectral filter portion 90, each substantially electrically insulated from the first conductive portion 76 and the first spectral filter portion 86. This configuration allows for placement of a first conductive material 124 (e.g., a silver-containing conductive epoxy, a conductive solder, ultrasonic solder, metal solder, conductive frit, a wire or other material capable of electrical transfer) adjacent to the primary seal 46 such that a first electrical clip 132, which is in contact with the primary seal 46, is further in electrical communication with the first conductive material 124, the third conductive portion 100, the second conductive portion 80, and the electro-optic medium 54. The material, or composition of materials, forming the third conductive portion 100 and the first conductive material 124 may be chosen to promote durable electrical communication between the first electrical clip 132 and the materials leading to the electro-optic medium 54.

The second isolation area 96 of the exemplary electro-optic element 10 cooperates with a portion of the primary seal 46 to define the fourth conductive portion 104 (if present) that is substantially electrically insulated from the third conductive portion 100, the optical layer 114, the optional overcoat 116 and the electro-optic medium 54. This configuration allows for placement of a second conductive material 136 adjacent to the primary seal 46 such that a second electrical clip 140 is in electrical communication with the second conductive material 136, the third spectral filter portion 112, the first conductive portion 76 and the electro-optic medium 54. The material, or composition of materials, forming the second conductive material 136 and the first conductive portion 76, may be chosen to promote durable electrical communication between the second electrical clip 140 and the materials leading to the electro-optic medium 54.

In various embodiments, the electro-optic element 10 may be an electrochromic element. In such embodiments, the electro-optic medium 54 may be an electrochromic medium, which includes at least one solvent or plasticizer, at least one anodic material, and at least one cathodic material. Typically, both of the anodic and cathodic materials are electroactive and at least one of them is electrochromic. It will be understood that regardless of its ordinary meaning, the term "electroactive" will be defined herein as a material that undergoes a modification in its oxidation state upon exposure to a particular electrical potential difference. Additionally, it will be understood that the term "electrochromic" will be defined herein, regardless of its ordinary meaning, as a material that exhibits a change in its extinction coefficient at one or more wavelengths upon exposure to a particular electrical potential difference. Electrochromic components, as described herein, include materials whose color or opacity are affected by electric current, such that when an electrical field is applied to the material, the color or opacity changes from a first phase to a second phase. The electrochromic component may be a single-layer, single-phase component, multi-layer component, or multi-phase component, as described in U.S. Pat. No. 5,928,572 entitled "ELECTROCHROMIC LAYER AND DEVICES COMPRISING SAME," U.S. Pat. No. 5,998,617 entitled "ELECTROCHROMIC COMPOUNDS," U.S. Pat. No. 6,020,987 entitled "ELECTROCHROMIC MEDIUM CAPABLE OF PRODUCING A PRE-SELECTED COLOR," U.S. Pat. No. 6,037,471 entitled "ELECTROCHROMIC COMPOUNDS," U.S. Pat. No. 6,141,137 entitled "ELECTROCHROMIC MEDIA FOR PRODUCING A PRE-SELECTED COLOR," U.S. Pat. No. 6,241,916 entitled "ELECTROCHROMIC SYSTEM," U.S. Pat. No. 6,193,912 entitled "NEAR INFRARED-ABSORBING ELECTROCHROMIC COMPOUNDS AND DEVICES COMPRISING SAME," U.S. Pat. No. 6,249,369 entitled "COUPLED ELECTROCHROMIC COMPOUNDS WITH PHOTOSTABLE DICATION OXIDATION STATES," and U.S. Pat. No. 6,137,620 entitled "ELECTROCHROMIC MEDIA WITH CONCENTRATION ENHANCED STABILITY, PROCESS FOR THE PREPARATION THEREOF AND USE IN ELECTROCHROMIC DEVICES"; U.S. Pat. No. 6,519,072 entitled "ELECTROCHROMIC DEVICE"; and International Patent Application Serial Nos. PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," PCT/EP98/03862 entitled "ELECTROCHROMIC POLYMER SYSTEM," and PCT/US98/05570 entitled "ELECTROCHROMIC POLYMERIC SOLID FILMS, MANUFACTURING ELECTROCHROMIC DEVICES USING SUCH SOLID FILMS, AND PROCESSES FOR MAKING SUCH SOLID FILMS AND DEVICES," which are herein incorporated by reference in their entirety.

In the depicted embodiment, the conductive polymeric barrier 58 is positioned between the first conductive portion 76 of the first electrically conductive layer 26 and the cavity 54 and/or between the electrically conductive layer 42 and the cavity 54. In embodiments where the polymeric barrier 58 is not electrically conductive, the barrier 58 may be placed between either substrates 14, 30 and the conductive layers 26, 42.

In the depicted embodiment, the conductive polymeric barrier 58 is depicted as positioned between the first and third spectral filter portions 86, 112, but at least a portion of the polymeric barrier 58 may be disposed on the first and third spectral filter portions 86, 112. For example, the polymeric barrier 58 may be positioned between the first conductive portion 76 and the first and third spectral filter portions 86, 112, or the polymeric barrier 58 may be positioned between the first and third spectral filter portions 86, 112 and the electro-optic medium 54. It will be understood that the polymeric barrier 58 may also be positioned between the first substrate 14 and the first electrically conductive layer 26, without departing from the spirit of this disclosure. The electro-optic element 10 may additionally include a second polymeric barrier 62 positioned proximate the third surface 34. In the depicted embodiment, the second polymeric barrier 62 is positioned between the third conductive portion 100 and the optical layer 114. In other embodiments, the second polymeric barrier 62 may be positioned between the third surface 34 and the third conductive portion 100, between the optical layer 114 and the overcoat 116, or between the overcoat 116 and the electro-optic medium 54. In various embodiments, the polymeric barrier 58 and the second polymeric barrier 62 may be configured to resist the penetration of gases, or have a low permeability to gases (e.g., hydrogen, oxygen, nitrogen, carbon dioxide and/or noble gases). The polymeric barrier 58 may include a crystalline polymer, polyvinyl alcohol, ethylene vinyl alcohol (EVOH), polyvinylidene chloride, polymers made from vinylidene chloride, polyepichlorohydrin, nylon, polyoxymethylene (POM), polyethylene terephthalate (PET), polybutylene terephthalate (PBT), polytetrafluoroethylene (PTFE), isotactic polypropylene, atactic polypropylene, high-density polyethylene, low-density polyethylene, other polymers having low gas permeability and/or combinations thereof. The polymeric barrier 58 and second polymeric barrier 62 may have different compositions. The polymeric barrier 58 and the second polymeric barrier 62 may be composed of multiple layers of polymers or multiple layers of polymers and layers of inorganic metal oxides. In various embodiments, the polymeric barrier 58 and second polymeric barrier 62 may be "sealed" within the electro-optic element 10 by being placed inboard of the primary seal 46 and/or the first and third spectral filter portions 86, 112.

In various embodiments, the polymeric barrier 58 and second polymeric barrier 62 may be doped, impregnated or otherwise rendered electrically conductive with the use of a transparent conductor or conductive material. Use of polymeric materials for the polymeric barrier 58 and second polymeric barrier 62 which are not electrically conductive may result in a malfunction or failure of the electro-optic element 10 due to the first and/or third conductive portions 76, 100 not having sufficient electrical contact with the electro-optic medium 54. Accordingly, the polymeric barrier 58 and second polymeric barrier 62 may be doped, impregnated or mixed with the transparent conductor or conductive material. The transparent conductor or conductive material may include indium-tin-oxide, doped tin oxide, zinc oxide, conductive metals, carbon nanotubes, conductive polymer nanofibers, other conductive materials and/or combinations thereof in sufficient quantities to render the polymeric barrier 58 and second polymeric barrier 62 electrically conductive. In various embodiments, the transparent conductor may be dispersed within the polymeric barrier 58 and second polymeric barrier 62 as a multitude of nano-scale particles such that light (e.g., visible light) is not substantially scattered, a haze is not produced and the polymeric barrier 58 remains largely optically transparent. The haze of the barrier 58 may be less than about 10%, less than about 6%, less than about 3%, less than about 2% or less than about 1%. It will be understood that the polymeric barrier 58 and the second polymeric barrier 62 may have different compositions and particle sizes of the transparent conductor than one another without departing from the spirit of this disclosure.

Figure 2:
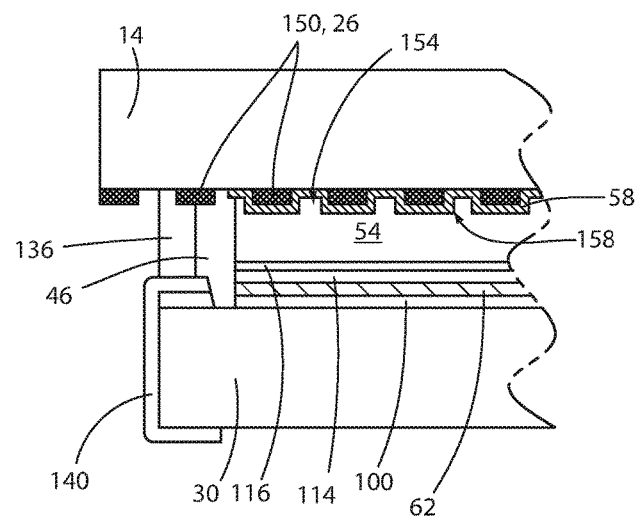
FIG. 2 is a cross-sectional view depicting an electrically conductive layer, according to one example.

Referring now to FIG. 2, depicted is an embodiment of the electro-optic element 10 utilizing a patterned electrically conductive mesh 150 as the first electrically conductive layer 26. The mesh 150 may be continuous, semi-continuous or non-continuous. As explained above, the conductive mesh 150 of the first and second electrically conductive layers 26, 42 may be composed of, for example, silver nanowires, copper, carbon nanotubes and/or graphene. In some embodiments, the material of the mesh 150 may not be electrochemically stable. In such embodiments, the barrier layer 58 or the second barrier layer 62 may coat the patterned mesh 150 and be sufficiently thick to render the first and second electrically conductive layers 26, 42 electrochemically stable to oxidation and/or reduction, or passivate the first and second electrically conductive layers 26, 42 to protect them from damage during element 10 operation. The mesh 150 may have sufficient thickness such that conductive peaks 154 are formed with corresponding valleys 158. The conductivity of the polymeric barrier 58 may be sufficient that the valleys 158 are electro-optically active. For electrochromic devices this may mean that oxidation and reduction of the electro-optic material 54 within the valleys 158 may take place.

An exemplary manufacturing method is hereinafter detailed. First, moisture resistant polymeric embodiments of the first and second substrates 14, 30 are provided. Next, the first and second electrically conductive layers 26, 42 are applied to the respective second and third surfaces 22, 34 of the first and second substrates 14, 30 in a hot vacuum process. Next, the polymeric barrier 58 and the second polymeric barrier 62 are applied to the respective first and second electrically conductive layers 26, 42. Finally, completing assembly of the electro-optic element 10 is performed.

Figure 3A:
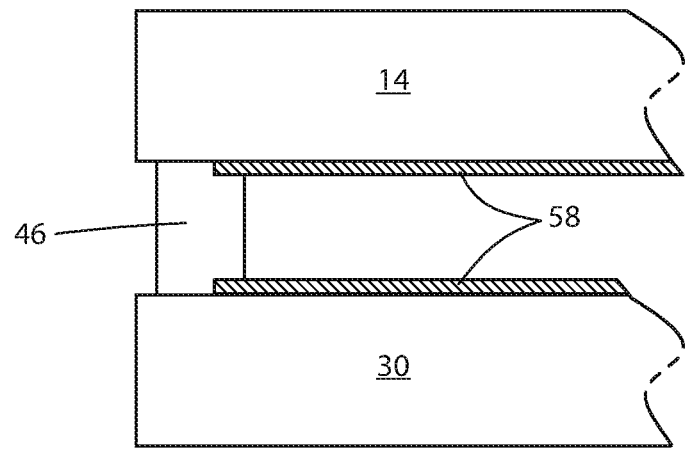
FIG. 3A is a cross-sectional view depicting a primary seal, according to one example.
Figure 3B:
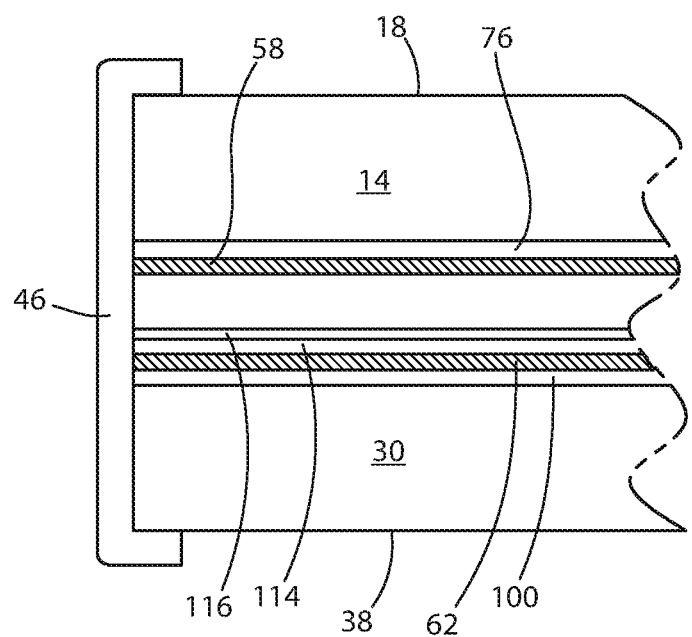
FIG. 3B is a cross-sectional view depicting the primary seal, according to another example.

Referring now to FIGS. 3A and 3B, depicted are schematic embodiments of the electro-optic element 10 with different schematic embodiments of the primary seal 46. The primary seal 46 may be positioned between the first and second substrates 14, 30 (FIG. 3A) or extend on a perimeter of the first and second substrates 14, 30. In the depicted embodiment, the primary seal 46 may extend onto the first surface 18 and the fourth surface 38. In some embodiments, the primary seal 46 may exist between the first and second substrates 14, 30, exist on the perimeter of the substrates 14, 30, exist on the first and fourth surfaces 18, 38, and combinations thereof. The polymeric barrier 58 and second polymeric barrier 62 may extend between the first or second substrates 14, 30 and the primary seal 46.

Use of this disclosure may offer several advantages. For example, the use of polymeric materials for the first and second substrates 14, 30 may offer a weight savings over traditional glass substrates. Frequently, polymeric materials are either moisture resistant or have a low gas permeability, but not both. As such, use of a moisture resistant polymer for the first and second substrates 14, 30, while offering a weight savings, may expose the electro-optic medium 54 to gases (e.g., oxygen) present in the environment of the electro-optic element 10 that may permeate through the substrates 14, 30 and damage the electro-optic medium 54. However, use of the polymeric barrier 58 and the second polymeric barrier 62, in low gas permeability embodiments, prevents the penetration of gas (e.g., oxygen) into the electro-optic medium 54, while still providing sufficient electrical communication to function the electro-optic element 10. Additionally, selecting a high melting temperature polymer for the first and second substrates 14, 30 allows for the application of the first and second electrically conductive layers 26, 42 without damage to the first and second substrates 14, 30. By selecting a moisture resistant polymer for the first and second substrates 14, 30 and positioning the polymeric barrier 58 and the second polymeric barrier 62 inboard of the primary seal 46, or inboard of the outermost portion of the primary seal 46, a moisture resistant and gas resistant electro-optic element 10 may be achieved.

The present disclosure may be used with a rearview assembly such as that described in U.S. Pat. Nos. 8,925,891; 8,814,373; 8,201,800; and 8,210,695; U.S. Patent Application Publication Nos. 2014/0063630 and 2012/0327234; and U.S. Provisional Patent Application Nos. 61/709,716; 61/707,676; and 61/704,869, which are hereby incorporated herein by reference in their entirety. Further, the present disclosure may be used with a rearview packaging assembly such as that described in U.S. Pat. Nos. 8,885,240; 8,814,373; 8,646,924; 8,643,931; and 8,264,761; and U.S. Provisional Patent Application Nos. 61/707,625; and 61/590,259, which are hereby incorporated herein by reference in their entirety. Additionally, it is contemplated that the present disclosure can include a bezel such as that described in U.S. Pat. Nos. 8,827,517; 8,210,695; and 8,201,800, which are hereby incorporated herein by reference in their entirety.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components, electrical or mechanical, and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments, without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and, further, it is to be understood that such concepts are intended to be covered by the following claims unless these claims, by their language, expressly state otherwise.

What is claimed is:

1. An electro-optic element comprising:
    a first substantially transparent substrate having first and second surfaces disposed on opposite sides thereof, wherein the second surface comprises a first electrically conductive layer;
    a second substantially transparent substrate having third and fourth surfaces disposed on opposite sides thereof, wherein the third surface comprises a second electrically conductive layer, further wherein at least one of the first and second substantially transparent substrates comprises a polymer;
    a primary seal positioned on a perimeter of the first and second substantially transparent substrates;
    an electro-optic medium disposed between the first and second substantially transparent substrates, the electro-optic medium being variably transmissive such that the electro-optic medium is operable between generally clear and darkened states; and
    a polymeric barrier disposed between the first substantially transparent substrate and the electro-optic medium, wherein a portion of the polymeric barrier is inside the primary seal and a portion of the polymeric barrier is outside the primary seal.

2. The electro-optic element of claim 1, wherein the polymeric barrier is configured to resist gas transmission.

3. The electro-optic element of claim 2, wherein the polymeric barrier is configured to resist the transmission of oxygen.

4. The electro-optic element of claim 2, wherein both of the first and second substantially transparent substrates comprise a polymer.

5. The electro-optic element of claim 1, wherein at least one of the first and second substantially transparent substrates comprises a moisture resistant polymer.

6. The electro-optic element of claim 1, wherein the polymeric barrier is doped with a conductive material.

7. The electro-optic element of claim 6, wherein the conductive material comprises at least one of indium-tin-oxide, doped tin oxide, zinc oxide, carbon nanotubes, nano-fibers and metals.

8. The electro-optic element of claim 7, wherein the conductive material is configured as a plurality of nano-scale particles or fibers.

9. The electro-optic element claim 8, wherein the polymeric barrier has a haze of less than about 6%.

10. An electro-optic element comprising:
    a first substantially transparent substrate having first and second surfaces disposed on opposite sides thereof;
    a second substantially transparent substrate having third and fourth surfaces disposed on opposite sides thereof, wherein the first and second substantially transparent substrates comprise a moisture resistant polymer;
    a primary seal disposed on a perimeter of the first and second substantially transparent substrates;
    an electro-optic medium positioned between the first and second substantially transparent substrates; and
    a polymer barrier positioned between at least one of the first substantially transparent substrate and the second substantially transparent substrate and the electro-optic medium, wherein a portion of the polymeric barrier is inside the primary seal and a portion of the polymeric barrier is outside the primary seal.

11. The electro-optic element of claim 10, wherein the moisture resistant polymer comprises at least of one of cyclo olefin, polyethylene terephthalate, polyethylene naphthalate, and polyimide.

12. The electro-optic element of claim 10, further comprising:
    an electrically conductive layer positioned on the second surface, wherein the polymeric barrier is disposed on the electrically conductive layer.

13. The electro-optic element of claim 12, wherein the polymeric barrier is electrically conductive.

14. The electro-optic element of claim 12, wherein the polymeric barrier is configured to resist gas transmission and passivate the electrically conductive layer.

15. An electro-optic element comprising:
    a first substantially transparent substrate having first and second surfaces disposed on opposite sides thereof, the first substantially transparent substrate comprising a moisture resistant polymer;
    a second substantially transparent substrate having third and fourth surfaces disposed on opposite sides thereof, the second substantially transparent substrate comprising a moisture resistant polymer;
    a primary seal extending from the first substrate to the second substrate;

an electro-optic medium positioned between the first and second substantially transparent substrates; and a polymeric barrier positioned between the first substantially transparent substrate and the electro-optic medium, the polymeric barrier configured to resist gas transmission, wherein a portion of the polymeric barrier is inside the primary seal and a portion of the polymeric barrier is outside the primary seal.

16. The electro-optic element of claim 15, wherein the polymeric barrier is positioned between the electro-optic medium and an electrically conductive layer.

17. The electro-optic element of claim 16, wherein the polymeric barrier is electrically conductive.

18. The electro-optic element of claim 17, where the primary seal extends from the first surface to the fourth surface.

19. The electro-optic element of claim 18, wherein the polymeric barrier includes a transparent conductor and has a haze of less than about 6%.

* * * * *